May 13, 1952     H. S. PORTOGALLO     2,596,866
ACTION PRODUCING MEANS FOR MUSICAL INSTRUMENTS
Filed March 31, 1950     2 SHEETS—SHEET 1
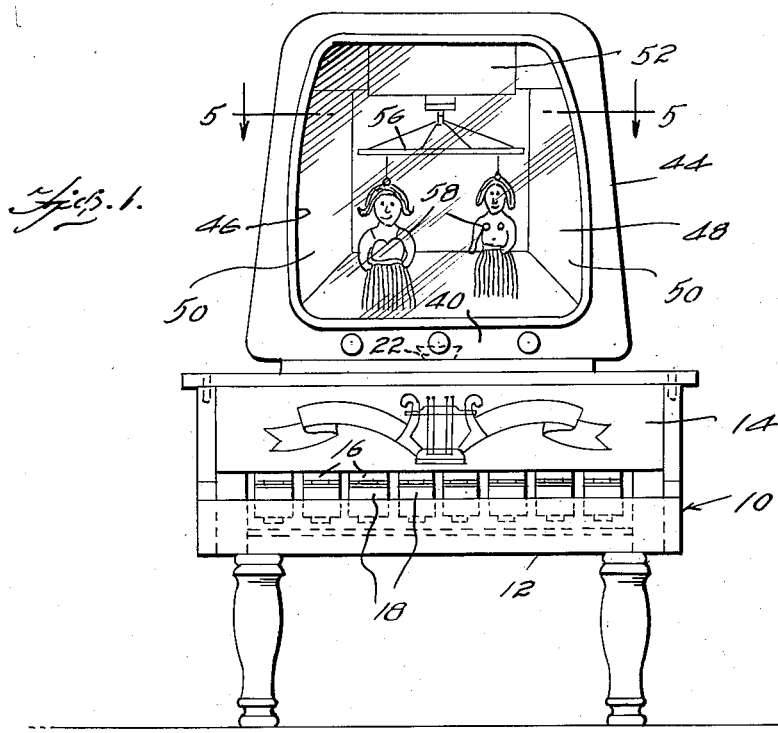
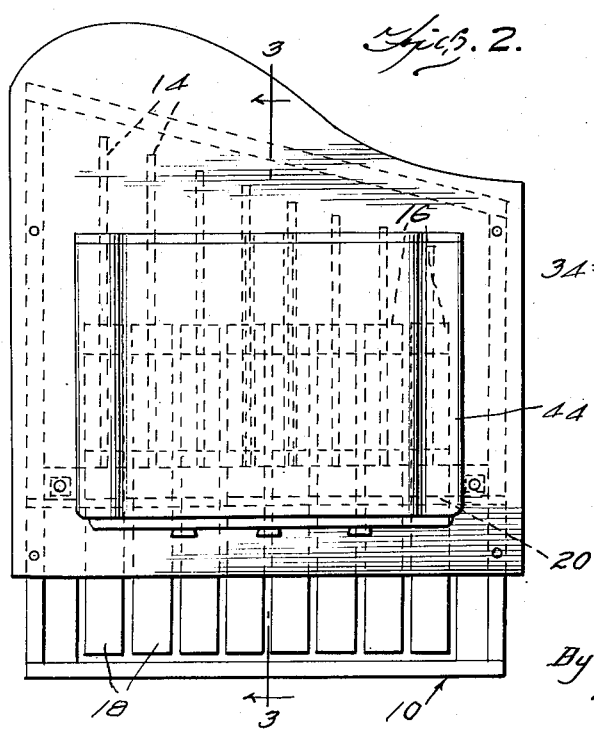
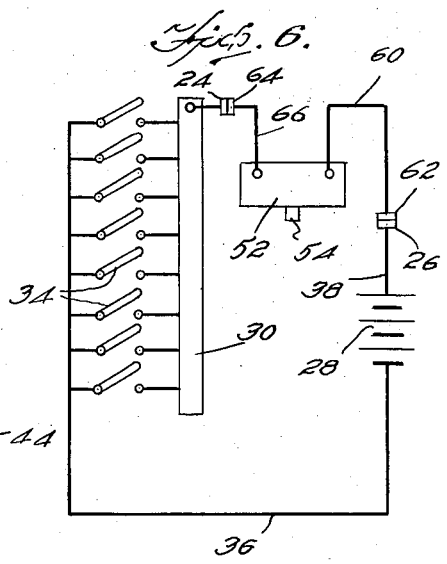
Inventor
Henry S. Portogallo
By Wilfred E. Lawson
Attorney May 13, 1952      H. S. PORTOGALLO      2,596,866
ACTION PRODUCING MEANS FOR MUSICAL INSTRUMENTS
Filed March 31, 1950      2 SHEETS—SHEET 2
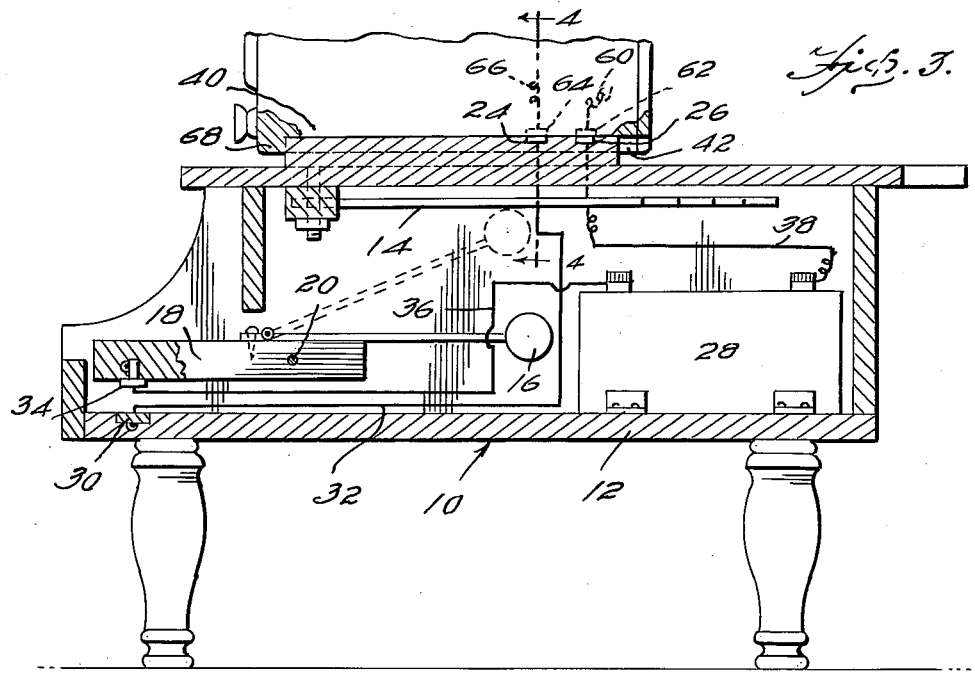
Inventor
Henry S. Portogallo
By Wilfred E. Lawson
Attorney Patented May 13, 1952

2,596,866

UNITED STATES PATENT OFFICE 2,596,866

ACTION PRODUCING MEANS FOR MUSICAL INSTRUMENTS

Henry S. Portogallo, Los Angeles, Calif.

Application March 31, 1950, Serial No. 153,069

5 Claims. (Cl. 46—45)

This invention relates to an action producing means for a musical instrument and more particularly an attachment for a toy piano in the nature of a stage upon which dolls are apparently dancing.

The primary object of the invention is to afford amusement and entertainment as the instrument is being played, and to provide visual as well as audible entertainment.

Another object is to detachably couple the stage to the instrument so that it may be easily removed therefrom for transportation or storage.

A still further object of the invention is to produce the illusion of a multiplicity of figures dancing on a stage, and as nearly as possible to simulate a group of human dancers.

The above and other objects may be attained by employing this invention which embodies among its features a miniature stage detachably coupled to a musical instrument such as a toy piano, one or more movable figures suspended above said stage, and means coupled to the action of the toy piano and to the figures for moving the figures as the keys of the piano are depressed.

Other features include an electro-magnet supported above said stage, a movable armature associated with said electro-magnet, miniature figures suspended from the armature above said stage, and electrical means connected to the electro-magnet and to the action of the piano to energize said magnet as the keys of the piano are played and thereby cause the figures suspended above the stage to simulate dancing movements.

Still other features include a suitable source of electrical power housed within the case of the piano, a bus bar carried by the piano beneath the keys thereof, contacts carried by the keys for engagement with the bus bar and leads connecting the bus bar with the electro-magnet and the contacts with the power source and the power source with the electro-magnet.

In the drawings:

Figure 1 is a front view of a toy piano showing this improved attachment mounted thereon for cooperation therewith;

Figure 2 is a top plan view of the structure illustrated in Figure 1;

Figure 3 is a vertical sectional view taken substantially along the line 3—3 of Figure 2;

Figure 4 is a vertical sectional view taken substantially along the line 4—4 of Figure 3;

Figure 5 is a horizontal sectional view taken substantially along the line 5—5 of Figure 1; and Figure 6 is a diagrammatic view of the electrical circuit employed in connection with this device.

Referring to the drawings in detail a toy piano designated generally 10 is equipped with a case 12 housing the reeds 14 which are struck by the hammers 16 when the keys 18 are depressed. The keys 18 are mounted to rock about a horizontally disposed pivot bar 20 all in a conventional manner. The top of the piano is provided with a horizontally extending dove tail 22 having embedded in its upper surface the spaced contact members 24 and 26, the purpose of which will more fully hereinafter appear.

Housed within the case 12 is a suitable power source 28 such as a dry cell, and fixed to the piano case beneath the keys 18 is a bus bar 30 which is connected through the medium of a lead 32 with the contact member 24. Carried by each key is a contact member 34, and these contact members are coupled through the medium of a lead or conductor 36 with one terminal of the power source 28 as will be readily understood upon reference to Figure 3. The opposite terminal of the power source 28 is connected through the medium of a conductor or lead 38 to the contact member 26. It will thus be seen that when a key 18 is depressed, its respective contact 34 will engage the bus bar 30, thus energizing the contact 24 to complete the flow of electrical energy from the power source 28 through the electro-magnet 52 to be more fully hereinafter described.

A suitable stage 40 is provided with a dove tail groove 42 for the reception of the dove tail 22 detachably to couple the stage to the miniature piano as will be readily understood upon reference to the drawings. The stage 40 is provided with a hood 44 having in its front face a window 46 which is preferably covered by a transparent panel 48 by which the interior of the housing 44 may be viewed. In the preferred form of the invention, the interior of the housing is lined with the mirrors 50 so that objects on or suspended above the stage will appear in multiple.

Suspended within the housing 44 above the stage 40 is an electro-magnet 52 having a movable armature 54 from the lower end of which is suspended a suitable figure suspending frame 56, and suspended from said frame are figures 58 simulating human dancers. One terminal of the electro-magnet 52 is coupled through the medium of a conductor or lead 60 with a contact member 62 which is mounted in the bottom of the dove tail groove 42 in such a position that when the stage 40 is in proper position on the piano case 12, the contact 62 will engage the contact 26, thus connecting the electro-magnet 52 with the power source through the conductor 38. Mounted in the bottom of the dove tail groove 42 in spaced relation to the contact 62 is a contact 64 which is connected through the medium of a conductor 66 with the opposite terminal of the electro-magnet 52 and this contact member 64 engages the contact member 24, so that when a piano key 18 is depressed the electro-magnet 52 will be energized. It is to be noted that the dove tail 42 does not extend to the entire front edge of the stage, but terminates short thereof to form a stop 68 by which rearward movement of the stage relative to the piano case 12 is arrested so as to bring the contacts 26 and 62, and the contacts 24 and 64 into proper alignment to complete the electrical circuit.

In the preferred form of the invention the figure suspending means 56 comprises a disk which is supported on a group of radial cords 70 which converge and are coupled to the armature 54 of the electro-magnet through a suitable eye 72 in order that as the armature moves, the figure suspending means will not only move in unison with it, but will also be free to rock about the lower end thereof.

In use the stage 40 is mounted on the piano case as illustrated in Figure 3, and with a properly charged dry cell 28 coupled as previously described to the conductors or leads 36 and 38, it will be evident that as the piano is played, the contacts 34 on the keys 18 will engage the bus bar 30, thus energizing the electro-magnet 52 and causing the armature to vibrate and move the figures or dolls 58 to cause them to dance over the surface of the stage 40.

While in the foregoing there has been shown and described the preferred form of this invention, it is to be understood that minor changes in the details of construction, combination and arrangement of parts may be resorted to without departing from the spirit and scope of the invention as claimed.

I claim:

1. In combination with a musical instrument having movable keys upon the depression of which musical sounds are produced, action producing means comprising a normally open electrical circuit including a power source, an electro-magnet in said circuit, said magnet having a movable armature adjacent said instrument, a dancing figure suspended from said armature, a bus bar carried by said instrument adjacent the keys, said bus bar being connected to one open terminal of said electrical circuit, a contact carried by each key for engagement with the bus bar when its respective key is depressed, and means connecting the contacts with the opposite open terminal of the electrical circuit.

2. An attachment for a musical instrument having movable keys upon the depression of which musical sounds are produced comprising a miniature stage mounted on said instrument, a normally open electrical circuit which includes a power source and an electro-magnet, said electro-magnet having a movable armature mounted above said stage, a dancing figure suspended from said armature, a bus bar mounted on the instrument adjacent the movable keys, said bus bar being connected to one open terminal of the electrical circuit, a contact carried by each key for engaging said bus bar when its respective key is depressed, and said contacts being connected to the opposite open terminal of the electrical circuit whereby when a key is depressed the circuit will be closed and the armature moved to cause the figure to move.

3. An attachment for a musical instrument having movable keys upon the depression of which musical sounds are produced comprising a miniature stage mounted on said instrument, a normally open electrical circuit which includes a power source and an electro-magnet, said electro-magnet having a movable armature mounted above said stage, a figure suspending frame carried by the armature above said stage, dancing figures suspended from said frame above said stage, a bus bar mounted on said instrument adjacent said movable keys, said bus bar being connected to one open terminal of the electrical circuit, a contact carried by each key for engaging said bus bar when its respective key is depressed, and said contacts being connected to the opposite open terminal of said electrical circuit whereby when a key is depressed the electrical circuit will be completed and the armature and figures will be moved.

4. In a musical instrument having movable keys upon the depression of which musical sounds are produced and a dove tail on the instrument for coupling an attachment thereto, an attachment for said instrument comprising a stage having a dove tail groove in its underside for receiving the dove tail on the instrument, movable figure suspending means above said stage, figures suspended from said figure suspending means, and means associated with the dove tails and the keys for actuating said figure suspending means when the keys are depressed.

5. In a musical instrument having movable keys upon the depression of which musical sounds are produced and a dove tail on the instrument for coupling an attachment thereto, an attachment for said instrument comprising a stage having a dove tail groove in its underside for receiving the dove tail on the instrument, a normally open electrical circuit which includes a power source and an electro-magnet above said stage, a movable armature carried by the electro-magnet for movement thereby above said stage, a bus bar beneath the keys, said bus bar being connected to one open terminal of said circuit, a contact on each key, said contacts being connected to the opposite open terminal of said circuit whereby when a key is depressed the circuit will be closed through thee lectro-magnet, and separable contacts carried by the dove tail and a wall of the dove tail groove whereby the attachment may be detached from the instrument.

HENRY S. PORTOGALLO.

REFERENCES CITED

The following references are of record in the file of this patent:

UNITED STATES PATENTS

| Number | Name | Date |
| --- | --- | --- |
| 1,280,307 | Rust | Oct. 1, 1918 |
| 2,052,890 | Marks | Sept. 1, 1936 |
| 2,184,675 | Kehm | Dec. 26, 1939 |
| 2,242,611 | Kunen | May 20, 1941 |